Aug. 21, 1951     R. F. HOLLIS     2,565,371
APPARATUS FOR TESTING PAPERBOARD
WITH CONTROLLED PRESSURE
Filed July 31, 1946
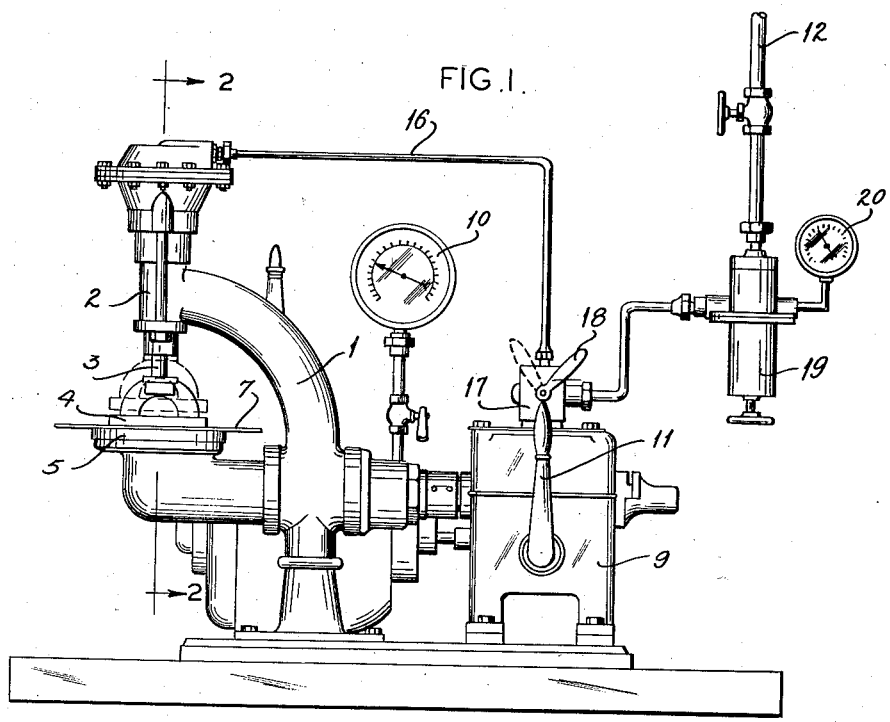
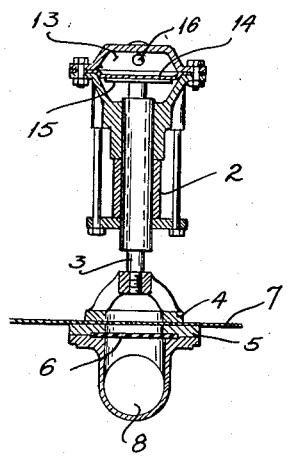
INVENTOR:
ROBERT F. HOLLIS
BY
ATTORNEYS Patented Aug. 21, 1951

2,565,371

UNITED STATES PATENT OFFICE 2,565,371

APPARATUS FOR TESTING PAPERBOARD WITH CONTROLLED PRESSURE

Robert F. Hollis, Alton, Ill., assignor to Alton Box Board Company, Alton, Ill., a corporation of Delaware Application July 31, 1946, Serial No. 687,374

2 Claims. (Cl. 73—102)

This invention relates generally to the testing of paper products, such as boxboard, cardboard, and the like, and has particular reference to improving the reliability of the so-called Mullen test.

One of the standard tests to which cardboard, boxboard, and the like is universally subjected is the Mullen test, which is a test of the rupture strength of the paper material and is carried out with an apparatus of the general type shown in the patent to Mullen, No. 358,056, of February 22, 1887, or the patent to Clark, No. 2,340,733. It is a well known fact that test specimens, from the same run of board, Mullen tested by the manufacturer give one value, yet give another value when tested by the purchaser. It has been supposed by some that the discrepancy between Mullen test values of specimens (from the same run), taken at different times and places, was attributable to atmospheric conditions or the moisture content of specimens. Others have suggested that a heterogeneous sheet like paper board should not be expected to exhibit uniformity of physical properties, but the frequently great disparity of Mullen test values would seem to eliminate this reason. The fact that the tested area is destroyed in the test renders retest for comparison impossible.

I have discovered that the great disparity between Mullen test values obtained from duplicate test specimens to be attributable to quite a different factor and the general object of the present invention is the rectification thereof.

The standard Mullen test machine involves a pair of jaws for gripping an annular area of the test specimen so that the portion of the specimen (one square inch in area) at the center of the annulus is free of clamping pressure. A rubber diaphragm arranged to engage the unconfined center area within the clamped annulus is distended, upon the application of fluid pressure, until the test specimen (one square inch at the center of the annular clamped area) assumes the load of the diaphragm. When the fluid pressure has increased to a degree such as to rupture the test specimen, the fluid pressure is noted as the Mullen test value of the specimen.

Heretofore, the clamping jaws of the Mullen tester have been actuated by a handwheel and screw or other comparable manual means. One test machine operator may clamp the test specimen very tight; another just tight enough to hold it firmly. There has been no assurance that a given operator would consistently clamp his test specimen with uniform pressure and there has heretofore been no way in which such clamping pressure could be finitely determined, regulated, or standardized so that the test might be duplicated under the same conditions. It has been observed that variation in the clamping pressure substantially affects the Mullen test values.

A particular object of the present invention is to improve the accuracy and reliability of the Mullen testing of paper sheets.

Other objects will become apparent to those skilled in the art when the following description is read in connection with the accompanying drawings, in which:

Figure 1 is a view in side elevation of a Mullen testing apparatus modified in accordance with the present invention; and Figure 2 is a longitudinal sectional view, taken along line 2—2 of Figure 1, showing the clamping jaws and the actuating mechansm therefor, according to one embodiment of the present invention.

According to the present invention, a Mullen apparatus is provided with mechanism whereby, and the Mullen testing process so modified that, the pressure applied to the test specimen is predetermined and made capable of standardization. In the embodiment illustrated in the drawings, the aforesaid intendments are accomplished by the provision of a fluid pressure-energized means for actuating the clamping jaws of the Mullen testing machine. Such an arrangement, if supplied with air or other fluid under uniform pressure, will apply the same clamping pressure to the test specimens throughout an entire series of tests. If provision is made for varying the pressure of the energizing fluid system, a suitable gauge or automatic control is required to assure uniformity of clamping pressure on the specimens throughout a series of tests. The finite value of the clamping pressure, while definitely effective upon the Mullen test value achieved, is not of critical importance in the invention so long as the pressure is high enough to prevent slippage of the specimen during test and low enough to avoid shearing the specimen by compression.

Referring now to Figure 1 of the drawings, the parts constituting the standard Mullen testing apparatus will first be described. Such an apparatus involves a frame member 1 having a boss 2, in which is mounted for vertical movement a shaft 3 carrying at its lower end an annular clamping ring 4. Disposed in alignment with the clamping ring 4 is an annular bed 5, The ring 4 is adapted to be moved vertically into and out of position whereat a test specimen is clamped between said ring 4 and the bed 5. It will be observed from Figure 2 that both the ring 4 and the bed 5 are centrally apertured and in the usual case the area of such central aperture amounts to one square inch. Mounted in bed 5 is an elastic diaphragm 6, usually of rubber, which is distendable into engagement with a specimen of paper 7 being tested. In order to distend the diaphragm 6 into engagement with the test specimen 7, provision is made for the application of fluid pressure within a chamber 8 situated below the diaphragm 6. An electrically energized fluid pump 9 is provided for gradually building up the pressure on the fluid in chamber 8, and a gauge 10 is connected to indicate the pressure at any increment of time on the fluid within chamber 8. The usual Mullen testing apparatus embodies a control handle 11, which is moved out of its neutral position, as shown in Figure 1, in order to initiate operation of the pump 9. When the pump 9 has operated to such an extent that the fluid in chamber 8 has distended diaphragm 6 to the point such that the portion of the test specimen 7 defined by the central openings in ring 4 and bed 5 ruptures, the pressure indicated by gauge 10 is recorded as the Mullen test value of the specimen being tested.

The present invention contemplates the provision of an adjunct to the parts of the standard Mullen testing apparatus just described in order to predetermine and standardize the pressure exerted upon the test specimen 7 by the clamping ring 4 and bed 5 before pressure is applied within chamber 8. In the embodiment shown in the drawings, such adjunct mechanism is fluid-energized as, for instance, from a source of compressed air 12. In the embodiment shown, a fluid pressure chamber member 13 is mounted upon boss 2 of frame 1 and arranged to receive shaft 3, so that the latter may reciprocate up and down therein. The chamber 13 is provided with a partitioning diaphragm 14, on the lower side of which, a head 15, connected with shaft 3, is attached. Into the portion of chamber 13 above diaphragm 14, a fluid pressure line 16 leads. A valve 17, having a handle 18, is provided for controlling the flow of pressure fluid from the source to chamber 13. If desired, and as shown in the drawings, a reducing valve 19 may be provided between the source of compressed air 12 and the line 16. Such a reducing valve is provided with a gauge 20 to indicate the fluid pressure in the line, which will be applied to diaphragm 14 when valve 17 is open.

The operation of the apparatus, assuming the clamping ring 4 to be situated in the dotted line shown in Figure 1, is as follows:

The test specimen 7 is placed upon bed 5, reducing valve 19 is manipulated to an extent such that gauge 20 shows the pressure selected for application to the clamping ring 4 in the test at hand, which may, for example, be 70 pounds per square inch. When the selected pressure is indicated by gauge 20, valve 17 is opened by movement of the handle 18 from the dotted line position shown in Figure 1 to its full line position. Thereupon, the air pressure will be applied within chamber 13 above diaphragm 14, so as to move shaft 3 and clamping ring 4 downwardly into clamping engagement with the test specimen 7. The pressure exerted by clamping ring 4 upon the test specimen 7 is obviously in direct proportion to the air pressure indicated by gauge 20.

With the test specimen thus clamped in position on bed 5, lever 11 is thrown to actuate pump 9. Pressure is built up within chamber 8 until diaphragm 6 has distended into engagement with test specimen 7 and applied sufficient pressure thereto to rupture the specimen. The pressure required to rupture the specimen is indicated by gauge 10 and is recorded as the Mullen test value of the specimen.

As indicative of the improved certainty and reliability of Mullen tests conducted in accordance with the present invention, in contrast to Mullen tests conducted in the conventional manner where the clamping ring 4 is moved into clamping position manually and without definite control of the pressure exerted by the clamps, a number of specimens were tested by both procedures. The comparative tests involved subjecting each test specimen to a plurality of ruptures, first, with the clamping ring 4 run down manually to apply a relatively high clamping pressure to the test specimen (as some Mullen test operators do), second, with the clamping ring 4 run down manually with only sufficient pressure upon the test specimen 7 to inhibit slippage of the latter (as some Mullen test operators do), and third, to subject the same specimen to testing in accordance with the present invention where the clamping pressure is predetermined and controlled. In each of the first, second, and third series of tests, each individual specimen was ruptured in at least three places by each procedure and the Mullen test value noted for each rupture. The results are indicated in the following table:

| Specimen | Manually Clamped | | | | | | Fluid Pressure Clamped | | |
|---|---|---|---|---|---|---|---|---|---|
| | First | | | Second | | | | | |
| | High | Av. | Low | High | Av. | Low | High | Av. | Low |
| A | 20 | 18 | 16 | 44 | 38⅔ | 32 | 26 | 26 | 26 |
| B | 22 | 21 | 19 | 49 | 43⅔ | 37 | 27 | 26⅓ | 25 |
| C | 21 | 18⅔ | 16 | 39 | 36⅓ | 34 | 27 | 26 | 25 |
| D | 27 | 22⅔ | 19 | 34 | 33 | 31 | 26 | 25⅓ | 24 |
| E | 93 | 88⅓ | 82 | 127 | 122 | 115 | 110 | 108 | 105 |
| F | 100 | 92⅓ | 84 | 135 | 130⅓ | 124 | 102 | 100⅔ | 100 |
| G | 94 | 88⅔ | 82 | 120 | 118⅔ | 117 | 107 | 104⅓ | 102 |
| H | 125 | 120⅔ | 114 | 161 | 150⅔ | 143 | 142 | 139⅓ | 137 |
| I | 119 | 113⅔ | 105 | 167 | 147⅔ | 139 | 133 | 130⅔ | 128 |
| J | 119 | 107⅓ | 100 | 143 | 139⅓ | 134 | 132 | 130⅓ | 129 |
| K | 119 | 115⅓ | 108 | 147 | 141 | 136 | 135 | 132 | 130 |

Test specimens A, B, C, and D were .0003" kraft paper. Test specimens E, F, and G were .010" kraft paper. Test specimens H, I, J, and K were .015" kraft paper. In testing specimens A to G, inclusive, in accordance with the present invention, the fluid pressure indicated by gauge 20 was 70 pounds per square inch, while in the case of specimens H to K, inclusive, the fluid pressure indicated by gauge 20 was 85 pounds per square inch.

The foregoing table not only illustrates the wide disparity between Mullen test values obtained on the same specimen by an operator who clamped the specimen tightly and another operator who clamped the specimen with only sufficient tightness to inhibit slippage, but further illustrates the disparity between successive tests on the same specimen by the same operator. In contrast to the disparity between the Mullen test values obtained when the specimen is manually clamped, the data shown in the foregoing table demonstrate the consistency of the values obtained when the specimen is clamped under predetermined pressure. For example, of the several ruptures performed upon specimen A by the first operator, there was a variation in Mullen test values from a high of 20 to a low of 16. The same specimen, when tested by the second operator (rupturing regions in the specimen which had not been affected by the previous test), showed a variation over the several ruptures from a high of 44 to a low of 32. The same specimen, when tested in accordance with the present invention, however, ruptured consistently at 26. Referring to specimen J as another example of the wide disparity of test values obtained under manual clamping as contrasted with the more consistent values when tested in accordance with the present invention, it will be observed that the several ruptures performed by the first operator gave readings on gauge 10 varying between a high of 119 and a low of 100. The readings taken by the second operator varied between 143 and 134. It is to be remembered that the only difference between the first and second series of tests was the degree of pressure applied to the test specimen. The same test specimen, when tested in accordance with the present invention, varied over a range of 132 to 129.

From the foregoing description, those skilled in the art should readily appreciate that the present invention provides a process and apparatus whereby the Mullen testing of paper sheets is more reliable than the process and apparatus heretofore employed in the art. It is contemplated that the clamping pressure be included as a related factor to any specified Mullen test value, so that all testers of specimens furnished under a particular specification will clamp the test specimen with the same degree of pressure.

While in the embodiment shown in the drawings, the clamping member 4 is actuated by fluid pressure means, it will be readily understood that other mechanical or even manual means may be utilized for actuating the clamping member provided some control or indication of the clamping pressure is available. While the pneumatically operated clamp illustrated in the drawings is practical, economic, and certain in its operation, it is not to be understood that the invention is limited thereto or to the particular form of pneumatic operating mechanism shown and described.

Having thus described the invention, what is claimed and desired to be secured by Letters Patent is:

1. The combination with a paper testing apparatus having clamping jaws for clamping a test specimen to be ruptured, a rupturing element arranged so as to impose pressure on a limited area of the clamped specimen, a pump for actuating said rupturing element, and an indicator for the last mentioned pressure; of an independent fluid pressure system including a pressure regulator having a gauge, a pressure responsive member for driving the clamping jaws into engagement with the test specimen, and a valve between said regulator and said fluid pressure responsive member, said gauge being connected in the system on the regulator side of said valve.

2. The combination with a paper testing apparatus having clamping jaws for clamping a test specimen to be ruptured, a rupturing element arranged so as to impose pressure on a limited area of the clamped specimen, a pump for actuating said rupturing element, an indicator for the last mentioned pressure, and means for moving said clamping jaws into and maintaining them in position to exert clamping pressure on the test specimen, the magnitude of said clamping pressure being independent of the pressure on said rupturing element; of a gauge for indicating the magnitude of said clamping pressure.

ROBERT F. HOLLIS.

REFERENCES CITED

The following references are of record in the file of this patent:

UNITED STATES PATENTS

| Number | Name | Date |
|---|---|---|
| 358,056 | Mullen | Feb. 22, 1887 |
| 1,025,101 | Stanley | Apr. 30, 1912 |
| 1,116,118 | Putnam | Nov. 3, 1914 |
| 1,452,944 | Webb | Apr. 24, 1923 |
| 1,599,964 | Haven | Sept. 14, 1926 |
| 1,834,073 | Senna | Dec. 1, 1931 |
| 2,186,213 | Senna | Jan. 9, 1940 |
| 2,340,733 | Clark | Feb. 1, 1944 |